US00RE48176E

(19) United States
(12) Reissued Patent
van Diggelen et al.

(10) Patent Number: US RE48,176 E
(45) Date of Reissued Patent: *Aug. 25, 2020

(54) METHOD AND APPARATUS FOR GENERATING AND DISTRIBUTING SATELLITE TRACKING INFORMATION IN A COMPACT FORMAT

(75) Inventors: Frank van Diggelen, San Jose, CA (US); Charles Abraham, San Jose, CA (US); James W. LaMance, San Jose, CA (US)

(73) Assignee: AVAGO TECHNOLOGIES INTERNATIONAL SALES PTE. LIMITED, Singapore (SG)

( * ) Notice: This patent is subject to a terminal disclaimer.

(21) Appl. No.: 13/237,550

(22) Filed: Sep. 20, 2011

Related U.S. Patent Documents

Reissue of:
(64) Patent No.: 6,651,000
Issued: Nov. 18, 2003
Appl. No.: 09/915,219
Filed: Jul. 25, 2001

(51) Int. Cl.
*G01S 19/27* (2010.01)
*G01S 19/25* (2010.01)
*G01S 19/05* (2010.01)

(52) U.S. Cl.
CPC ..... *G01S 19/27* (2013.01); *G01S 19/05* (2013.01); *G01S 19/258* (2013.01)

(58) Field of Classification Search
USPC ..... 701/400, 468, 469, 470, 484; 342/357.44–357.46, 357.42, 357.64, 342/357.66, 352, 357.43; 327/361, 347, 327/349, 352
See application file for complete search history.

(56) References Cited

U.S. PATENT DOCUMENTS

| | | | |
|---|---|---|---|
| 4,445,118 | A | 4/1984 | Taylor et al. |
| 4,751,512 | A | 6/1988 | Longaker |
| 4,884,208 | A | 11/1989 | Marinelli et al. |
| 4,894,662 | A | 1/1990 | Counselman |
| 5,043,736 | A | 8/1991 | Darnell et al. |
| 5,119,504 | A | 6/1992 | Durboraw, III |
| 5,148,179 | A | 9/1992 | Allison |

(Continued)

FOREIGN PATENT DOCUMENTS

| | | | |
|---|---|---|---|
| CA | 2177310 | A1 | 12/1996 |
| EP | 1 197 761 | A2 | 4/2002 |

(Continued)

OTHER PUBLICATIONS

Aparicio, M., et al. "GPS Satellite and Payload," Global Positioning System: Theory and Applications vol. I, Progress in Astronautics and Aeronautics, vol. 163, Ch. 6, pp. 209-244, 1996.

(Continued)

*Primary Examiner* — Peter C English
(74) *Attorney, Agent, or Firm* — Xsensus LLP

(57) ABSTRACT

A method and apparatus for creating and distributing satellite tracking data in a compact format to a remote receiver. At least a portion of the satellite tracking data is extracted from memory and is formatted into a compact format. The compact formatted data is transmitted to the remote receiver via a distribution network. Once this data is received at the remote receiver it is reformatted into a format prescribed by the remote receiver

27 Claims, 4 Drawing Sheets

(56) References Cited

U.S. PATENT DOCUMENTS 5,187,805 A 2/1993 Bertiger et al.
5,223,844 A 6/1993 Mansell et al.
5,225,842 A 7/1993 Brown et al.
5,365,450 A 11/1994 Schuchman et al.
5,408,237 A 4/1995 Patterson et al.
5,417,217 A 5/1995 Morita et al.
5,418,537 A 5/1995 Bird
5,420,592 A 5/1995 Johnson
5,430,657 A 7/1995 Kyrstos
5,444,450 A 8/1995 Olds et al. ..... 342/357.02
5,459,473 A 10/1995 Dempster et al.
5,477,228 A 12/1995 Tiwari et al.
5,506,781 A 4/1996 Cummiskey et al.
5,589,833 A 12/1996 Randall et al.
5,613,193 A 3/1997 Ishikawa et al. ..... 455/12.1
5,663,735 A 9/1997 Eshenbach
5,673,256 A 9/1997 Maine
5,726,893 A 3/1998 Schuchman et al.
5,736,960 A 4/1998 Murphy et al.
5,781,156 A 7/1998 Kranser
5,786,789 A 7/1998 Janky
5,812,087 A 9/1998 Krasner ..... 342/357
5,825,327 A 10/1998 Krasner
5,828,336 A 10/1998 Yunck et al.
5,831,574 A 11/1998 Krasner
5,841,396 A * 11/1998 Krasner ..... 342/357.75
5,845,227 A 12/1998 Peterson
5,862,495 A 1/1999 Small et al.
5,874,914 A 2/1999 Krasner
5,877,723 A 3/1999 Fan
5,877,724 A 3/1999 Davis
5,884,214 A 3/1999 Krasner
5,889,492 A 3/1999 Kurthy et al.
5,893,044 A 4/1999 King et al.
5,899,957 A 5/1999 Loomis
5,913,170 A 6/1999 Wortham
5,917,444 A 6/1999 Loomis et al.
5,920,278 A 7/1999 Tyler et al. ..... 342/33
5,938,721 A 8/1999 Dussell et al.
5,943,014 A 8/1999 Gilhousen
5,945,944 A 8/1999 Krasner
5,957,982 A 9/1999 Hughes et al.
5,963,167 A 10/1999 Lichten et al.
5,983,109 A 11/1999 Montoya
5,999,124 A 12/1999 Sheynblat
6,002,363 A 12/1999 Krasner
6,016,119 A 1/2000 Krasner
6,028,537 A 2/2000 Suman et al.
6,052,081 A 4/2000 Krasner
6,061,018 A 5/2000 Sheynblat
6,064,336 A * 5/2000 Krasner ..... 342/357.05
6,067,045 A 5/2000 Castelloe et al. ..... 342/357.09
6,075,987 A 6/2000 Camp, Jr. et al.
6,078,284 A 6/2000 Levanon ..... 342/357.16
6,081,229 A 6/2000 Soliman et al.
6,084,544 A 7/2000 Camp, Jr.
6,085,128 A 7/2000 Middour et al.
6,091,959 A 7/2000 Souissi et al.
6,097,974 A 8/2000 Camp, Jr. et al.
6,107,960 A 8/2000 Krasner
6,118,977 A 9/2000 Vannucci ..... 455/12.1
6,121,923 A 9/2000 King et al.
6,122,506 A 9/2000 Lau et al.
6,131,067 A 10/2000 Girerd et al.
6,133,874 A 10/2000 Krasner
6,134,483 A 10/2000 Vayanos et al. ..... 701/13
6,150,980 A 11/2000 Krasner
6,178,195 B1 1/2001 Durboraw, III et al.
6,185,427 B1 2/2001 Krasner et al.
6,188,351 B1 2/2001 Bloebaum
6,188,354 B1 2/2001 Soliman et al. ..... 342/387
6,191,731 B1 2/2001 McBurney et al.
6,204,804 B1 3/2001 Andersson ..... 342/113
6,204,808 B1 3/2001 Bloebaum et al.
6,211,817 B1 4/2001 Eschenbach
6,211,819 B1 4/2001 King et al. ..... 342/357.09
6,215,441 B1 4/2001 Moeglein et al. ..... 342/357.01
6,215,442 B1 4/2001 Sheynblat et al.
6,222,483 B1 4/2001 Twitchell et al.
6,239,742 B1 5/2001 Krasner
6,252,543 B1 6/2001 Camp ..... 342/357.06
6,256,475 B1 7/2001 Vannucci
6,272,316 B1 8/2001 Wiedeman et al.
6,285,315 B1 * 9/2001 Pratt ..... 342/357.42
6,285,316 B1 9/2001 Nir et al.
6,289,279 B1 9/2001 Ito et al.
RE37,408 E 10/2001 Loomis et al.
6,313,787 B1 11/2001 King et al. ..... 342/357.03
6,323,803 B1 11/2001 Jolley et al.
6,323,804 B1 11/2001 Kurby et al.
6,324,473 B1 11/2001 Eschenbach
6,369,751 B1 4/2002 Naruse
6,377,585 B1 4/2002 Funderburk et al.
6,389,291 B1 5/2002 Pande et al.
6,411,892 B1 6/2002 van Diggelen
6,411,899 B2 * 6/2002 Dussell et al. ..... 701/211
6,429,811 B1 * 8/2002 Zhao et al. ..... 342/357.66
6,430,503 B1 8/2002 McBurney et al.
6,433,739 B1 8/2002 Soliman
6,437,735 B1 8/2002 McMahan ..... 342/357.66
6,438,702 B1 8/2002 Hodge
6,453,237 B1 9/2002 Fuchs et al.
6,473,030 B1 10/2002 McBurney et al.
6,538,600 B1 3/2003 Richton et al.
6,542,820 B2 4/2003 LaMance et al.
6,560,534 B2 5/2003 Abraham et al.
6,570,530 B2 5/2003 Gaal et al.
6,573,799 B1 6/2003 Akopian
6,618,670 B1 9/2003 Cahnsarkar
6,636,740 B1 10/2003 Ramesh
6,642,884 B2 11/2003 Bryant et al.
6,651,000 B2 11/2003 van Diggelen et al.
6,693,882 B1 2/2004 Gu et al.
6,725,012 B1 4/2004 Janson et al.
6,725,159 B2 4/2004 Krasner
6,799,116 B2 9/2004 Robbins
6,813,560 B2 11/2004 van Diggelen et al.
6,829,535 B2 12/2004 van Diggelen et al.
6,856,282 B2 2/2005 Mauro et al.
6,922,546 B1 7/2005 Da et al.
7,020,555 B1 3/2006 Janky et al.
7,263,440 B2 8/2007 Garin et al.
7,548,816 B2 6/2009 Riben et al.
7,679,550 B2 3/2010 Garrison et al.
7,701,387 B2 4/2010 Syrjarinne
8,090,536 B2 1/2012 van Diggelen et al.
8,212,719 B2 7/2012 van Diggelen et al.
2002/0005802 A1 1/2002 Bryant et al.
2002/0024461 A1 2/2002 Moeglein et al.
2002/0032526 A1 3/2002 van Diggelen
2002/0049536 A1 4/2002 Gaal
2002/0172313 A1 11/2002 Smith et al.
2002/0188403 A1 12/2002 LaMance et al.
2002/0190898 A1 12/2002 Abraham et al.
2002/0198657 A1 12/2002 Robbins
2003/0023379 A1 1/2003 Diggelen et al.
2003/0098810 A1 5/2003 Lee et al.
2003/0212821 A1 11/2003 Gillies et al.
2003/0223422 A1 12/2003 Igarashi et al.
2004/0203853 A1 10/2004 Sheynblat
2004/0203915 A1 10/2004 van Diggelen et al.
2004/0263386 A1 12/2004 King et al.
2005/0003833 A1 1/2005 Younis
2006/0105708 A1 5/2006 Maeda et al.
2007/0103364 A1 5/2007 Garin et al.
2007/0200752 A1 8/2007 van Diggelen et al.
2008/0125971 A1 5/2008 van Diggelen et al.
2008/0189037 A1 8/2008 van Diggelen et al.
2009/0234571 A1 9/2009 Riben et al.

FOREIGN PATENT DOCUMENTS

GB 2 307 812 A 6/1997
WO WO 89/12835 A1 12/1989

(56) References Cited

FOREIGN PATENT DOCUMENTS

| | | | |
|---|---|---|---|
| WO | WO 98/09181 | A1 | 3/1998 |
| WO | WO 98/25157 | A1 | 6/1998 |
| WO | WO 99/19743 | A1 | 4/1999 |
| WO | WO 99/31524 | A1 | 6/1999 |
| WO | WO 99/53338 | A1 | 10/1999 |
| WO | WO 99/56144 | A1 | 11/1999 |
| WO | WO 00/10028 | A1 | 2/2000 |
| WO | WO 00/58750 | A1 | 10/2000 |
| WO | WO 01/73467 | A2 | 10/2001 |
| WO | WO 01/75473 | A2 | 10/2001 |
| WO | WO 02/071095 | A2 | 9/2002 |
| WO | WO 02/103383 | A2 | 12/2002 |
| WO | WO 03/010912 | A2 | 2/2003 |
| WO | WO 2007/092523 | A2 | 8/2007 |

OTHER PUBLICATIONS

Bertiger, W.I., et al,. "GPS precise tracking of Topex/Poseidon: Results and Implications," Journal of Geophysical Research, vol. 99, No. C12, pp. 24,449-24,464, Dec. 15, 1994.

Bertiger, W.I., et al. "GPS Precise Tracking of Topex/Poseidon: Results & Implications," Submitted for Publication to JGR Topex/Poseidon Special Issue, http://hdl.handle.net/2014/33763, Nov. 1993.

Brouwer, D. "Solution of the Problem of Artificial Satellite Theory without Drag," Astron J. 64: 378-397, Nov. 1959.

Cameron, M., et al., "Intelligent Transportation System Mayday Becomes a Reality," Naysys Corporation, IEEE 1985, 340-347.

Chansarkar, M., "Application for Patent- Resolving Time Ambiguity in GPS Using Over-Determined Navigation Solution," U.S. Appl. No. 60/232,738, filed Sep. 15, 2000.

Chansarkar, M., et al. "Acquisition of GPS Signals at Very Low Signal to Noise Ratio," ION NTM 2000, Anaheim, CA, pp. 731-737, Jan. 26-28, 2000.

Coleman, T. F., and Y. Li, "An interior, trust region approach for nonlinear minimization subject to bounds," SIAM Journal on Optimization, vol. 6, pp. 418-445, 1996.

Coleman, T. F., and Y. Li, "On the convergence of reflective Newton methods for large scale nonlinear minimization subject to bounds," Mathematical Programming, vol. 67, No. 2, pp. 189-224, 1994.

Commission Investigative Staffs Notice of Prior Art, Certain GPS Devices and Products Containing Same, United States International Trade Commission Investigation No. 337-TA-602, Feb. 15, 2008.

Commission Opinion, In the matter of Certain GPS Devices and Products Containing Same, United States International Trade Commission Investigation No. 337-TA-602, Washington, DC, issued Jan. 27, 2009.

Communication pursuant to Article 96(2) EPC for European Patent Application No. 02761149.0, 5 pages, dated Aug. 30, 2006.

Complainants' First Amended Complaint under Section 337 of the Tariff Act of 1930, as Amended, Certain GPS 35 Devices and Products Containing Same, United States International Trade Commission Investigation No. 337-TA-602, Feb. 8, 2008.

Complainants' Notice of Prior Art Pursuant to Ground Rule 5, Certain GPS Devices and Products Containing Same, United States International Trade Commission Investigation No. 337-TA-602, 12 pages, Feb. 15, 2008.

Diesposti, R., et al., "Of Mutual Benefit: Merging GPS and Wireless Communications," GPS World, vol. 9, No. 4, pp. 44-48, Apr. 1998.

Diesposti, R., et al., "The Benefits of Integrating GPS, INS and PCS," The Aerospace Corp., ION-GPS-98, Session D1, Receiver Systems and Technology I: New Receiver Architectures & Signal Processing Strategies, Nashville Convention Center, Nashville, Tennessee, pp. 327-331, Sep. 15-18, 1998.

Dietrich, F. J., "The Globalstar Cellular Satellite System," IEEE Transaction on Antennas and Propagation, 46 (6), Publisher item Identifier S 0018-926X(98), (Jun. 1998), 935-942.

Djuknic, G.M., et al., "Geolocation and Assisted GPS," Computer vol. 34, Issue 2 (Feb. 2001), 123-125.

Enge, P.K., et al., "Wide Area Augmentation System," Global Positioning System: Theory and Applications vol. II, Progress in Astronautics and Aeronautics, vol. 164, Ch. 4, pp. 117-142, 1996.

EPO Communication dated Mar. 24, 2011 in EP Application No. 08018477.3-1248 / 2056122, 10 pages.

Expert Report of Dr. Stephen Heppe Regarding Invalidity of U.S. Pat. Nos. 6,417,801, 6,606,346, 6,651,000, 6,704,651, 6,937,187, and 7,158,080, 390 pages, dated Feb. 25, 2008.

European Search Report, dated May 7, 2012, for EP Application No. 09000717.0 - 2220 / 2088448, 3 pages.

File History- U.S. Appl. No. 10/081,164, dated Feb. 22, 2002.

First Supplemental Report of Dr. Stephen Heppe Regarding Invalidity of U.S. Pat. Nos. 6,417,801, 6,606,346, 6,937,187 and 7,158,080, dated Apr. 14, 2008.

Francisco, S.G., "GPS Operational Control Segment," Global Positioning System: Theory and Applications, Ch. 10, pp. 435-466, 1994.

Garin, T.J., et al. "Wireless Assisted GPS-SiRF Architecture and Field Test Results," ION GPS '99, Nashville, TN, pp. 489-497, Sep. 14-17, 1999.

Hanna Sairo et al: "Multiple Level Integrity Monitoring in Assisted GPS," Proceedings of the Institute of Navigation (ION) GPS, XX, XX, Sep. 24, 2002, pp. 2129-2134, XP002473331.

Initial Determination, in the Matter of Certain Gps Devices and Products Containing Same, United States International Trade Commission Investigation No. 337-TA-602, Public Version, Washington, DC, issued Aug. 8, 2008 (served Nov. 25, 2008).

Interface Control Document for the Naystar GPS Space Segment/Navigation User Interfaces, Oct. 10, 1993, ICD-GPS-200C, 138 pages.

International GPS Service for Geodynamics, 1996 Annual Report, IGS Central Bureau, Nov. 1997.

International GPS Service for Geodynamics, 1997 Technical Reports, IGS Central Bureau, Oct. 1998.

International GPS Service for Geodynamics, 1999 Technical Reports, IGS Central Bureau, pp. 13-164, Nov. 2000.

International GPS Service for Geodynamics, 2000 Technical Reports, IGS Central Bureau, pp. 71-148, Nov. 2001.

International Preliminary Examination Report, dated Mar. 18, 2004, for PCT Application No. PCT/US02/23282, 5 pages.

International Search Report, dated Dec. 23, 2005, for PCT Application No. PCT/US04/39367, 3 pages.

International Preliminary Report on Patentability dated, May 22, 2006, for PCT Application No. PCT/US04/39367, 6 pages.

International Search Report and Written Opinion, dated Jul. 10, 2007, for PCT Application No. PCT/US2007/001187, 3 pages.

International Search Report and Written Opinion, dated May 15, 2006, for PCT Application No. PCT/US06/04422, 4 pages.

International Search Report, dated Feb. 20, 2004, for PCT Application No. PCT/US03/31222, 3 pages.

International Search Report, dated Aug. 21, 2003, for PCT Application No. PCT/US02/35311, 1 page.

International Search Report, dated Mar. 17, 2004, for PCT Application No. PCT/US03/30872, 4 pages.

Johnson, LT. G.W., "Communications Technologies for Automated Dependent Surveillance," USCG Research & Development Center (1995), 40-44.

Kao, M. H., et al. "Multiconfiguration Kalman Filter Design for High-Performance GPS Navigation," IEEE Transactions on Automatic Control, vol. AC-28, No. 3, Mar. 1983, pp. 304-314.

Kline, P.A.; "Atomic Clock Augmentation for Receivers using the Global Positioning System," Dissertation for Doctor of Philosophy, Virginia Polytechnic Institute and State University; Section 2.4.2.1 and Appendix A, 1997.

Knight, D.T., "Rapid Development of Tightly-Coupled GPS/INS Systems," IEEE AES Systems Magazine, Feb. 1997, pp. 14-18, Feb. 1997.

Lamance, J., et al. "Assisted GPS-Low Infrastructure Approach," GPS World, vol. 13, No. 3, pp. 46-51, Mar. 2002.

Lannelongue, Stephane, et al., "Fast Acquisition Techniques for G.P.S. Receivers," TTC and Navigation Section, European Space Agency (ESA/ESTEC), ION-GPS-98, Session 2B, Land Navigation, Denver, CO, pp. 261-269, Jun. 1-3, 1998.

(56) References Cited

OTHER PUBLICATIONS

Lin, X. et al. "Enhanced Accuracy GPS Navigation Using the Interacting Multiple Model Estimator," IEEEx-plore, IEEE, pp. 4-1911-4-1923, 2001.
Makino, H., "Development of Navigation System for the Blind Using GPS and Mobile Phone Combination," 18th Annual International Conference of the IEEE Engineering in Medicine and Biology Society (1996), 506-507.
Melbourne, W.G., et al., "Scientific Applications of GPS on Low Earth Orbiters," Jet Propulsion Laboratory, California Institute of Technology, http://hdl.handle.net/2014/32419, 1994.
Milliken, R. J., et al., "Principle of Operation of Navstar and System Characteristics," Navigation: Journal of the Institute of Navigation, vol. 25, No. 2, pp. 95-106, Summer 1978.
Naystar GPS Space Segment / Navigation User Interfaces, ICD-GPS-200, Jul. 3, 1991.
Naystar GPS, ICD-GPS-200, Revision C, Oct. 10, 1993, Oct. 13, 1995, Sep. 25, 1997, Oct. 1, 1999, Apr. 12, 2000, Jan. 14, 2003.
Naystar GPS, Interface Control Document GPS (200), Jul. 1, 1992.
Neilan, R.E., et al., "The International GPS Service: A Global Resource for GPS Applications and Research," Institute of Navigation, ION GPS-97, 10th International Technical Meeting, Kansas City, Missouri, Sep. 16-19, 1997.
Noe, P. S., et al., "A Navigation Algorithm for the Low-Cost GPS Receiver," Navigation: Journal of the Institute of Navigation, vol. 25, No. 2, pp. 258-264, Summer 1978.
Open Session Hearing, Certain GPS Devices and Products Containing Same, United States International Trade Commission Investigation No. 337-TA-602, vol. 10, pp. 2466-2469, 2481-2509, 2545-2578, 2590-2592, 2617-2646, 2673-2709, total 138 pages, Heritage Reporting Company, Washington, D.C., May 9, 2008.
Open Session Hearing, Certain GPS Devices and Products Containing Same, United States International Trade Commission Investigation No. 337-TA-602, vol. 11, pp. 2710-2713, 2760-2761, 2804-2837, 2845-2865, 2885-2894, 2904-2939, 2946-2950, total 113 pages, Heritage Reporting Company, Washington, D.C., May 12, 2008.
Open Session Hearing, Certain GPS Devices and Products Containing Same, United States International Trade Commission Investigation No. 337-TA-602, vol. 12, pp. 3007-3010, 3059-3063, 3078-3096, 3284-3384, total 130 pages, Heritage Reporting Company, Washington, D.C., May 13, 2008.
Open Session Hearing, Certain GPS Devices and Products Containing Same, United States International Trade Commission Investigation No. 337-TA-602, vol. 7, pp. 1652-1655, 1663-1672, 1683-1687, 1707-1819, 1829-1841, 1921-1937, 1942-1944, total 167 pages, Heritage Reporting Company, Washington, D.C., May 6, 2008.
Open Session Hearing, Certain GPS Devices and Products Containing Same, United States International Trade Commission Investigation No. 337-TA-602, vol. 8, pp. 1945-1949, 1960-1986, 2034-2047, 2050-2056, 2060-2082, 2100-2143, 2169-2174, 2206-2209, total 129 pages, Heritage Reporting Company, Washington, D.C., May 7, 2008.
Open Session Hearing, Certain GPS Devices and Products Containing Same, United States International Trade Commission Investigation No. 337-TA-602, vol. 9, pp. 2210-2213, 2409-2465, total 62 pages, Heritage Reporting Company, Washington, D.C., May 8, 2008.
Parkinson, B.W. et al: "Global Positioning System: Theory and Applications vol. I," Jan. 1, 1994, Global Positioning System: Theory and Applications; [Progress in Astronautics and Aeronautics vol. 163], Washington, DC: AIAA, US, pp. 136-139, XP002315814, ISBN: 978-1-56347-106-3.
Peterson, Capt. B., et al., "GPS Receiver Structures for the Urban Canyon," U.S. Coast Guard Academy, ION-GPS-95, Session C4, Land Vehicular Applications, Palm Springs, CA, pp. 1323-1332, Sep. 12-15, 1995.
Rebuttal Expert Report of Anthony R. Pratt, Ph.D. Regarding U.S. Pat. Nos. 6,704,651, 6,417,801 and 6,937,187, Rebuttal vol. I: The '651 Patent, Redacted--Non-Confidential Version, Mar. 10, 2008.
Rebuttal Expert Report of Anthony R. Pratt, Ph.D. Regarding U.S. Pat. Nos. 6,704,651, 6,417,801 and 6,937,187, Rebuttal vol. II: The '801 and '187 Patents, Redacted- Non-Confidential Version, Mar. 10, 2008.
Rebuttal Expert Report of Phil Dafesh Regarding U.S. Pat. Nos. 6,651,000 and 7,158,080 in Response to Expert Report of Stephen Heppe, Redacted- Non-Confidential Version, Mar. 10, 2008.
Respondent SiRF Technology, Inc.'s First Supplemental Objections and Responses to Global Locate, Inc.'s First Set of Interrogatories (Nos. 22, 23 and 49) and Exhibits 1-5 and 19-22, Aug. 24, 2007.
Respondent SiRF Technology, Inc.'s First Supplemental Objections and Responses to Global Locate, Inc.'s First Set of Interrogatories (Nos. 22, 23 and 49) and Exhibits 15-18, Aug. 24, 2007.
Respondent SiRF Technology, Inc.'s First Supplemental Objections and Responses to Global Locate, Inc.'s First Set of Interrogatories (Nos. 22, 23 and 49) and Exhibits 23-27, Aug. 24, 2007.
Respondent SiRF Technology, Inc.'s Sixth Supplemental Objections and Responses to Global Locate, Inc.'s First Set of Interrogatories (Nos. 19, 21-23, and 27-28), Apr. 13, 2008.
Respondents' (Mio Technology Limited, USA; MiTAC International Corporation; Pharos Science & Applications, Inc.; E-TEN Information Systems Co. Ltd.) First Supplemental Objections and Responses in Common to Global Locate, Inc.'s First Set of Interrogatories (Nos. 22, 23 and 49) and Exhibits 1-5 and 19-22, Aug. 31, 2007.
Respondents' (Mio Technology Limited, USA; MiTAC International Corporation; Pharos Science & Applications, Inc.; E-TEN. Information Systems Co. Ltd.) Fifth Supplemental Objections and Responses to Global Locate, Inc.'s First Set of Interrogatories (Nos. 19, 21-23 and 27-28), Apr. 3, 2008.
Respondents' (Mio Technology Limited, USA; MiTAC International Corporation; Pharos Science & Applications, Inc.; E-TEN. Information Systems Co. Ltd.) First Supplemental Objections and Responses in Common to Global Locate, Inc.'s First Set of Interrogatories (Nos. 22, 23 and 49) and Exhibits 23-27, Aug. 31, 2007.
Respondents' (Mio Technology Limited, USA; MiTAC International Corporation; Pharos Science & Applications, Inc.; E-TEN. Information Systems Co. Ltd.) First Supplemental Objections and Responses in Common to Global Locate, Inc.'s First Set of Interrogatories (Nos. 22, 23 and 49) and Exhibits 15-18, Aug. 31, 2007.
Respondents' First Supplemental Corrected Notice of Prior Art, Certain GPS Devices and Products Containing Same, United States International Trade Commission Investigation No. 337-TA-602, 158 pages, Mar. 4, 2008.
Respondents' Notice of Prior Art, Certain GPS Devices and Products Containing Same, United States International Trade Commission Investigation No. 337-TA-602, Feb. 15, 2008.
RTCA, Inc. Minimum Aviation System Performance Standards DGNSS Instrument Approach System: Special Category, RTCA/DO-217 (SCAT-I) (1993).
RTCM Recommended Standards for Differential Navstar GPA Service, Version 2.0, RTCM Special Committe No. 104, RTCM Paper 134-89/SC 104-68, Jan. 1, 1990.
Russell, S.S., et al. "Control Segment and User Performance," Navigation: Journal of the Institute of Navigation, vol. 25, No. 2, pp. 166-172, Summer 1978.
Schenewerk, Dr. Mark S., et al., "Rapid Turnaround GPS Ephemerides from the National Geodetic Survey," Proceedings of the ION GPS-93, Institute of Navigation, pp. 247-255, 1993.
Second Supplemental Report of Dr. Stephen Heppe Regarding Invalidity of U.S. Pat. Nos. 7,158,080, 6,651,000 and 6,704,651, Apr. 8, 2008.
Sennott, Dr., J. W., "A High Performance Position Tracker for Embedded Paging, Cellular Telephone, and Law Enforcement Applications". Department of Electrical and Computer Engineering and Technology, IEEE 1992 , 96-103.
SiRF v. Broadcom, U.S. Court of Appeals for the Federal Circuit, 2009-1262, decided Apr. 12, 2010.
SiRFstar I Architecture, Product Information, http://www.sirf.com/overview.htm, Apr. 11, 2000.

(56) References Cited

OTHER PUBLICATIONS

Spilker Jr., J.J., et al. "Overview of GPS Operation and Design," Global Positioning System: Theory and Applications vol. I, Progress in Astronautics and Aeronautics, vol. 163, Ch. 2, pp. 29-55, 1996.
Stewart, J. M., "Vehicle Location and Position Monitoring System Using Satellite Navigation and Cellular Telephone," LITEF GmbH, 7 & 1-15.
Sturza, M. A., "Architecture of the Teledesic Satellite System," Teledesic Corporation, 1-7.
Supplementary European Search Report, dated Sep. 22, 2004, for EP Application No. 01997046.6, 3 pages.
Syrjarinne, J., "Time Recovery Through Fusion of Inaccurate Network Timing Assistance with GPS Measurements," Proceedings of the Third International Conference on Fusion, vol. 2, pp. WeD5-3-WeD5-10, Jul. 10-13, 2000.
TIA/EIA Interim Standard, TIA/EIA/IS-801, Position Determination Service Standard for Dual Mode Spread Spectrum Systems (1999).
Van Diggelen, F., "Global Locate Indoor GPS Chipset & Services," Jon GPS 2001, Sep. 11-14, 2001, Salt Lake City, UT, USA, (Online) Sep. 11, 2001, pp. 1515-1521, XP002358532 Retrieved from the Internet: URL:http://ww.ion.org/:: (retrieved on Dec. 9, 2005).
Wheatley, C., "CDMA's Dependence on Good Timing and Related Issues," IEEE International Frequency Control Symposium, Qualcomm Incorporated (1996), 1211-1218.
Wu, S.C., et al. "MicroGPS for Low-Cost Orbit Determination," TDA Progress Report 42-131, pp. 1-12, Nov. 15, 1997.
Yiu, K., et al. "A Low-Cost GPS Receiver for Land Navigation," Global Positioning System, Hewlett-Packard Laboratories, Palo Alto, CA, pp. 44-60, May 1982.
Young, L., et al. "Gps Precision Orbit Determination: Measured Receiver Performance," Jet Propulsion Laboratory, California Institute of Technology, hllp://hdl.handle.net/2014/35887, 1993.
Zhao, Y., "Efficient and Reliable Data Transmission for Cellular-and-GPS-Based Mayday Systems," Motorola, Inc., Chicago Corporate Research Laboratories, IEEE 1998, 555-559.
Zhao, Y., "Mobile Phone Location Determination and Its Impact on Intelligent Transportation Systems," IEEE Transactions on Intelligent Transportation Systems, vol. 1, No. 1, Mar. 2000.
Zhao, Y., "Standardization of Mobile Phone Positioning for 3G Systems," IEEE Communications Magazine, Jul. 2002.
Zumberge, J.F., et al., "Ephemeris and Clock Navigation Message Accuracy," Global Positioning System: Theory and Applications, Ch. 16, pp. 585-599, 1994.
ISR dated May 29, 2003 for corresponding PCT application, PCT/US02/23282.
International Search Report dated May 29, 2003 for corresponding PCT application, PCT/US02/23282.

* cited by examiner

METHOD AND APPARATUS FOR GENERATING AND DISTRIBUTING SATELLITE TRACKING INFORMATION IN A COMPACT FORMAT

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application contains subject matter that is related to a U.S. patent application Ser. No. 09/875,809, filed Jun. 6, 2001, which is herein incorporated by reference in its entirety.

BACKGROUND OF THE INVENTION

1. Field of the Invention

The present invention generally relates to generating satellite tracking information for earth orbiting satellites. More specifically, the invention relates to a method and apparatus for generating and distributing satellite tracking information in a first format (e.g., a compact ephemeris model) through a network or communications link, then representing the satellite tracking information in a second format (e.g., a standard ephemeris model) at a receiver.

2. Description of the Related Art

A positioning receiver for the Global Positioning System (GPS) uses measurements from several satellites to compute a position. The process of acquiring the GPS radio signal is enhanced in speed and sensitivity if the GPS receiver has prior access to a model of the satellite orbit and clock. This model is broadcast by the GPS satellites and is known as ephemeris or ephemeris information. Each satellite broadcasts its own ephemeris once every 30 seconds. Once the GPS radio signal has been acquired, the process of computing position requires the use of the ephemeris information.

The broadcast ephemeris information is encoded in a 900 hit message within the GPS satellite signal. It is transmitted at a rate of 50 bits per second, taking 18 seconds in all for a complete ephemeris transmission. The broadcast ephemeris information is typically valid for 2 to 4 hours into the future (from the time of broadcast). Before the end of the period of validity the GPS receiver must obtain a fresh broadcast ephemeris to continue operating correctly and produce an accurate position. It is always slow (no faster than 18 seconds), frequently difficult, and sometimes impossible (in environments with very low signal strengths), for a GPS receiver to download an ephemeris from a satellite. For these reasons it has long been known that it is advantageous to send the ephemeris to a GPS receiver by some other means in lieu of awaiting the transmission from the satellite. U.S. Pat. No. 4,445,118, issued Apr. 24, 1984, describes a technique that collects satellite orbit information at a GPS reference station, and transmits the information to the remote GPS receiver via a wireless transmission. This technique of providing the ephemeris, or equivalent data, to a GPS receiver has become known as "Assisted-GPS". Since the source of ephemeris in Assisted-GPS is the satellite signal, the ephemeris information remains valid for only a few hours. As such, the remote GPS receiver must periodically connect to a source of ephemeris information whether that information is received directly from the satellite or from a wireless transmission. Without such a periodic update, the remote GPS receiver will not accurately determine position.

Furthermore, the Assisted-GPS systems typically retransmit the entire ephemeris message to the remote receiver. In many instances, bandwidth or packet size for the transmission of this message is not readily available.

Therefore, there is a need for a method and apparatus for providing, satellite trajectory and clock information to a remote receiver in a compact form.

SUMMARY OF INVENTION

The present invention is a method and apparatus for generating satellite tracking data (STD), then transmitting the data to a remote receiver in a compact form. The STD is derived by receiving at one or more satellite tracking stations the signals from at least one satellite and determining satellite tracking information (STI) through signal processing or by extracting the ephemeris message from the received signals. STI contains present satellite orbit trajectory data and satellite clock information.

The STD is reformatted into a compact format and provided to a remote satellite signal receiver via a network or communications system. The receiver converts the compact format into a standard format and uses the STD to compute the position of the receiver. The satellite system may include the global positioning system (GPS), GLONASS, GALILEO, or other satellite systems that may use STD to enhance the performance of the receiver.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Figure 1:
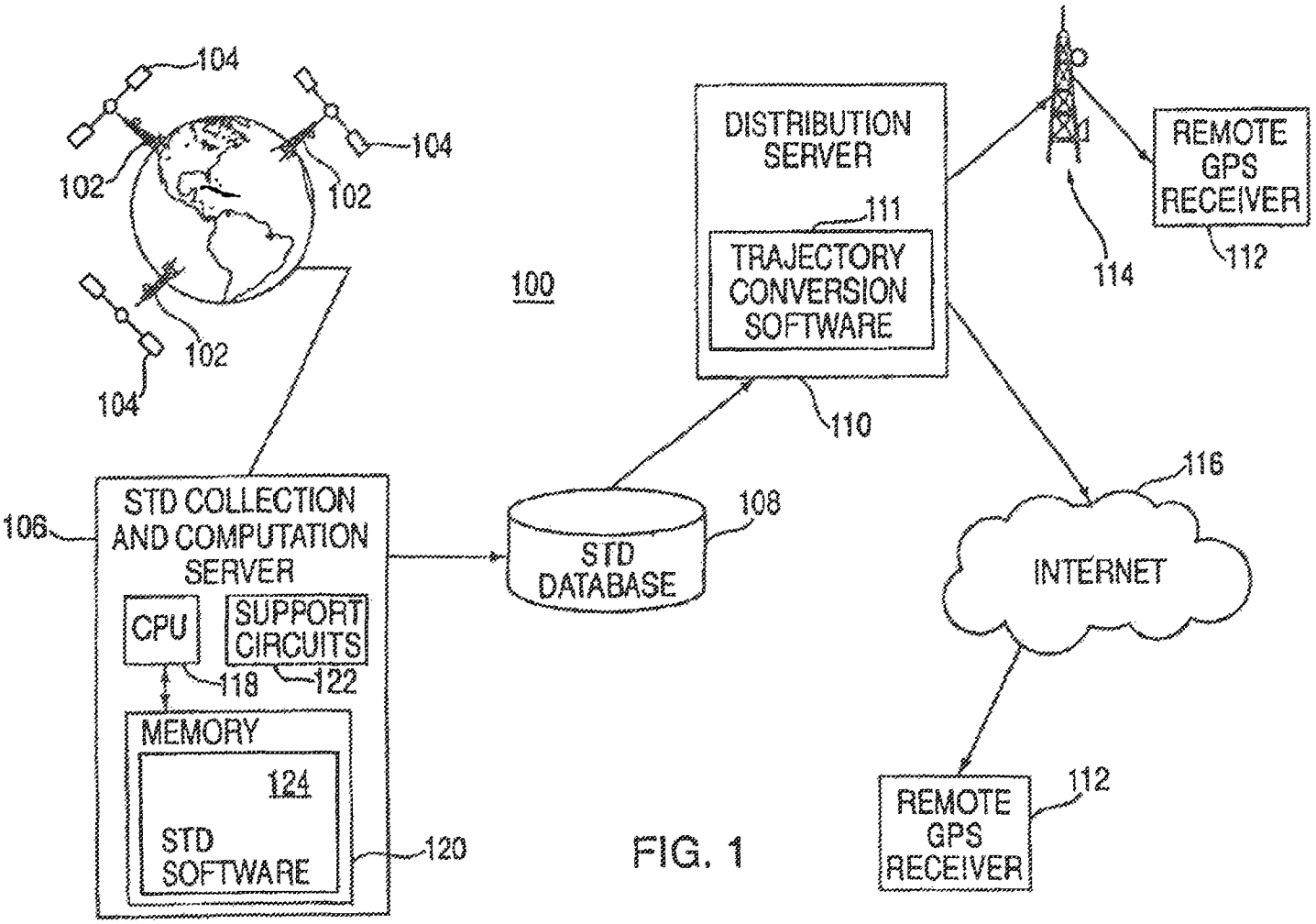
FIG. 1 depicts a system for creating and distributing satellite tracking data (STD) to remote GPS receivers.

FIG. 1 depicts a block diagram of a system 100 for creating and distributing satellite tracking data (STD). The satellite system may include the global positioning system (GPS), GLONASS, GALILEO, or other satellite systems that may use STD to enhance the performance of the receiver. The following disclosure uses GPS as an illustrative system within which the invention operates. From the following disclosure, those skilled in the art will be able to practice the invention in conjunction with other satellite based positioning systems.

A network of GPS tracking stations 102 is used to collect measurement data from the GPS satellites 104. Such a network is described in detail in U.S. patent application Ser. No. 09/615,105, filed Jul. 13, 2000 and incorporated herein by reference. The network could comprise several tracking stations that collect satellite tracking information (STI) from all the satellites in the constellation, or a few tracking stations, or a single tracking station that only collects STI for a particular region of the world. An STD collection and computation server 106 collects and processes the measurement data (this measurement data is referred to herein as satellite tracking information (STI) that includes at least one of: code phase measurements, carrier phase measurements, Doppler measurements, or ephemeris data). The ephemeris data may be the decoded ephemeris message extracted from the GPS signal itself.

The server may create long term STD in accordance with the teachings of U.S. patent application Ser. No. 09/875,809, filed Jun. 6, 2001, or standard ephemeris message data in accordance with the teachings of U.S. Pat. No. 5,365,450, issued Nov. 15, 1994, both of which are incorporated herein by reference. The server 106 may produce one or more of the following: 1) accurate satellite tracking data (STD) (e.g., a trajectory of each satellite and/or a clock offset measurement) during the data collection period, 2) a prediction of the future STD of each satellite, and 3) models that match the future STD of each satellite.

The server 106 comprises a central processing unit (CPU) 118, support circuits 122, and memory 120. The CPU 118 may be any one of the many CPUs available on the market to perform general computing. Alternatively, the CPU may be a specific purpose processor such as an application specific integrated circuit (ASIC) that is designed to process satellite tracking information. The support circuits 122 are well known circuits such as clock circuits, cache, power supplies and the like. The memory 120 may be read only memory, random access memory, disk drive storage, removable storage or any combination thereof. The memory 120 stores executable software, e.g., STD software 124, that, when executed by the CPU 118, causes the system 100 to operate in accordance with the present invention.

The set of satellite trajectory and clock data produced by the STD software 124. The STD is stored in an STD database 108. A distribution server 110 accesses the database 108 to gather the most recent set of STD, formats the data using the formatting software 111, and distributes the formatted data to GPS devices 112 that require satellite orbit information. The software 111 produces a compact format, e.g., a compact ephemeris model, in accordance with the present invention.

The distribution process may be implemented using some form of wireless communications system 114, or over the Internet 116, or a combination of both, or by some other means of communication. Once the GPS devices 112 have received the compact ephemeris model, they expand the model to a format that is conventional for receiver. The compact ephemeris model distributed to the GPS devices may be in a similar format as the broadcast ephemeris or may be some other model format that is defined by the GPS device. Herein this orbit data is generally referred to as a satellite tracking model (STM). The loading of the STM into the GPS receiver can be accomplished in many ways. Using the cradle for a personal digital assistant (PDA), direct connection to a network, or a wireless technology, such as Bluetooth or a cellular network, are a few examples of how the satellite data can be transferred to the receiver. The transmission is generally accomplished by broadcasting a compact model of the STD (or a compact model representing a portion of the STD) without knowledge of the specific location of the GPS receiver. As such, the distribution server does not require the GPS receiver to send any information through the network to the distribution server.

Since GPS is a ranging system in and of itself, the data transmitted by the GPS satellites can be used to determine the range, range-rate and clock offsets to the GPS satellites from a set of tracking stations. This set of observations generated by the tracking stations 102 is used in the orbit determination process, and in the estimation of the satellite clock characteristics. The set of monitoring stations 102 could be a single station, a public network such as the Continuously Operating Reference System (CORS), or a privately owned and/or operated network.

Figure 2:
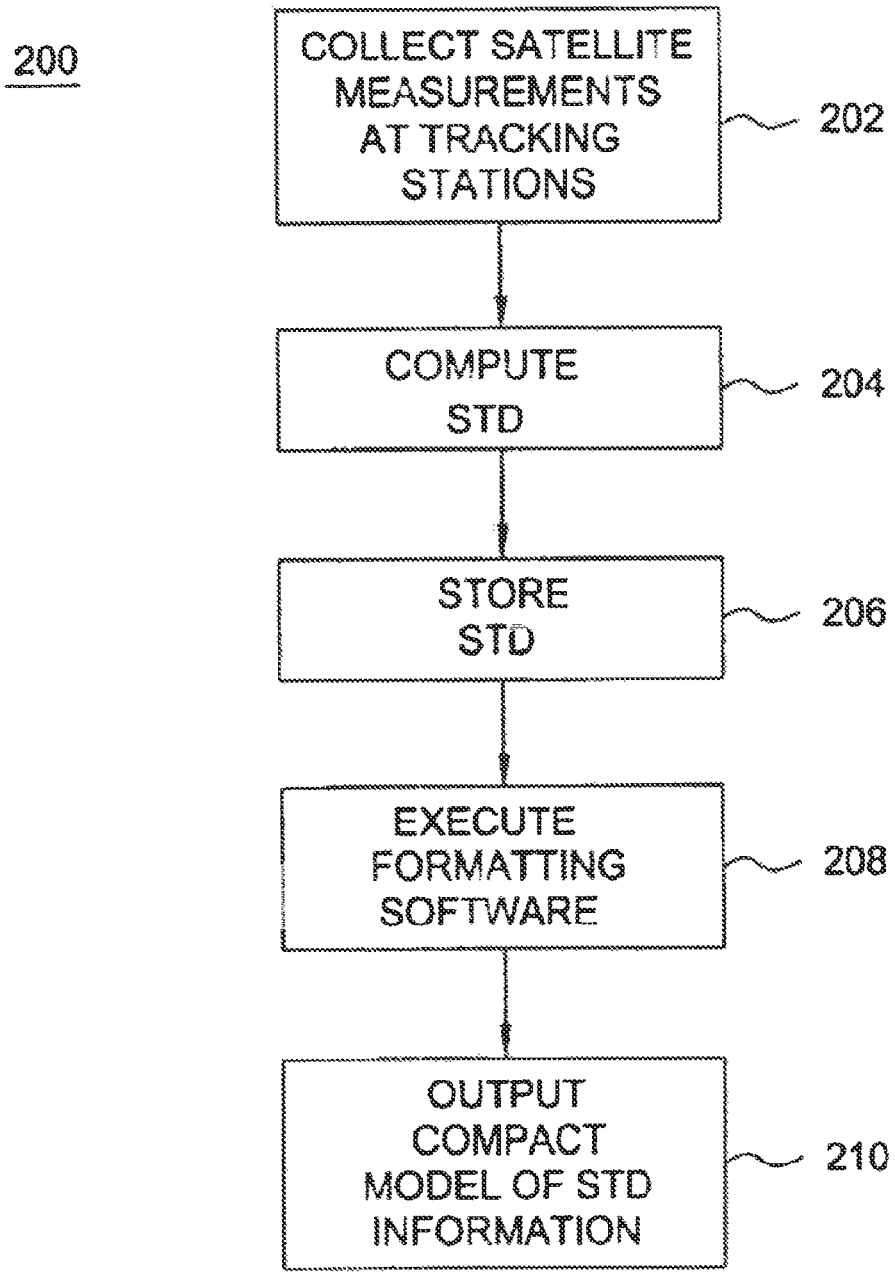
FIG. 2 depicts a flow diagram of a method for forming the STD from the satellite measurements made at satellite tracking stations.

FIG. 2 depicts a flow diagram of the process 200 of the present invention. The process 200 begins at step 202, wherein the satellite measurements are collected at the tracking stations. At step 204, the satellite trajectory data (STD) is computed or extracted from the satellite signals. The STD is then stored at step 206 in the STD database. At step 208, the database is accessed and the formatting software is executed to convert the formatting of the accessed STD. The formatted STD is output as the compact model at step 210.

One embodiment of the invention formats the STD as a subset of the standard ephemeris parameters defined in ICD-GPS-200c. Fitting the STD to the desired compact orbit model can be accomplished in a number of mathematical methods. The preferred embodiment is a least-squares fit of the orbit model parameters to the trajectory data. Other methods, such as Kalman filters or other estimators can also be used to obtain the orbit model parameters that best fit the trajectory data. These techniques of fitting data to orbit models are well known to people skilled in the art of orbit determination and orbit modeling.

Figure 3:
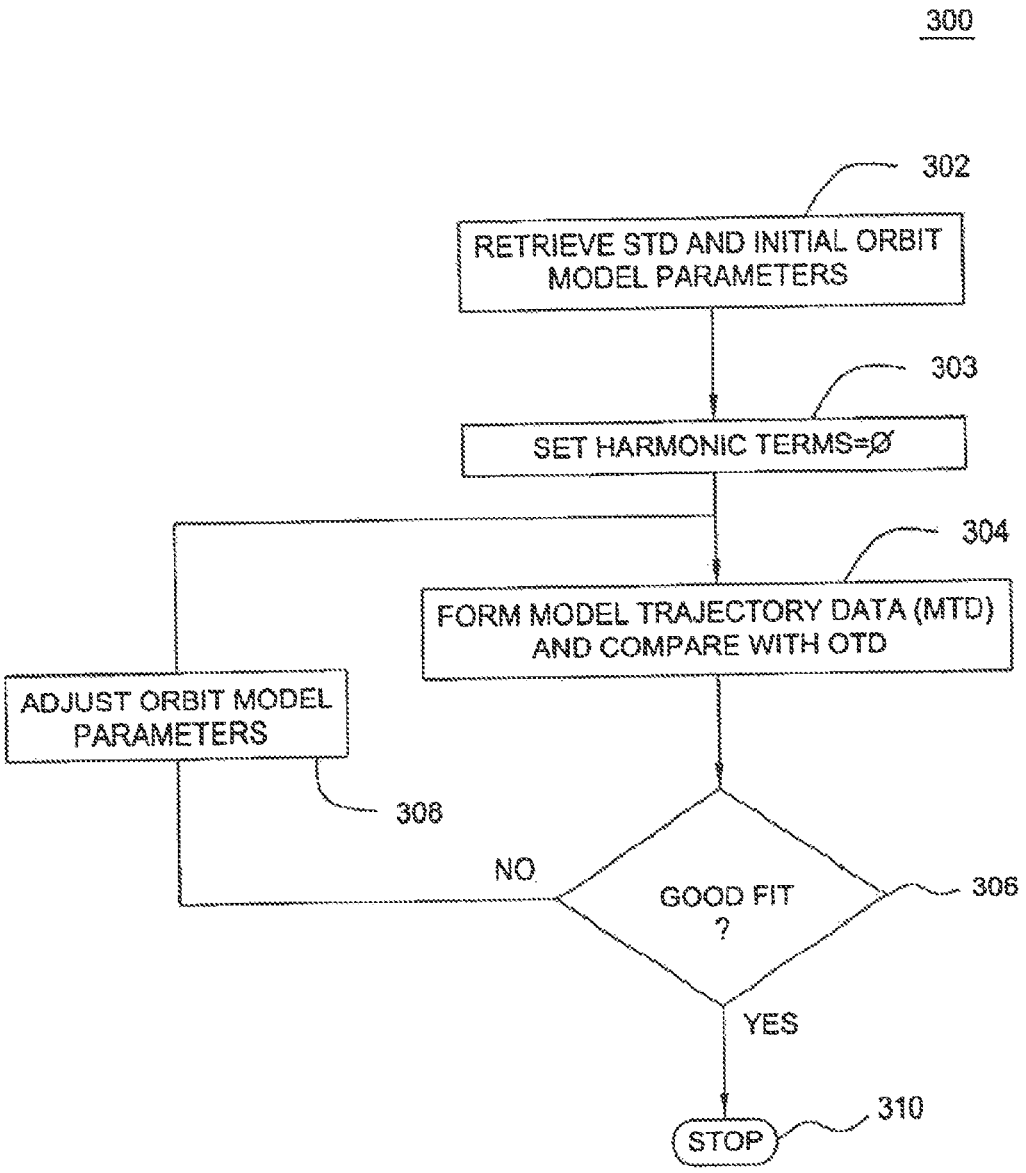
FIG. 3 depicts a flow diagram of a method for forming a compact orbit model in accordance with the present invention.

The least squares technique provides an optimal fit of the trajectory data to the model trajectory formed from the compact orbit model parameters. FIG. 3 depicts a flow diagram of a method of generating an orbit model using a least squares estimation technique.

At step 302, the STD for the desired time interval is extracted from the STD database. The orbit model parameters are initialized to the orbit model values obtained by a similar process for the previous interval. This guarantees that the initial orbit model parameters are a good fit at least for the beginning of the desired time interval. The rest of the process 300 will ensure that the parameters are adjusted so that they become a good fit for the entire time interval.

In the preferred embodiment there are 15 orbital parameters to be adjusted:

- Square root of semi-major axis (meters^½)
- Eccentricity (dimensionless)
- Amplitude of sine harmonic correction term to the orbit radius (meters)
- Amplitude of cosine harmonic correction term to the orbit radius (meters)
- Mean motion difference from computed value (radians/sec)
- Mean anomaly at reference time (radians)
- Amplitude of cosine harmonic correction term to the argument of latitude (radians)

Amplitude of sine harmonic correction term to the argument of latitude (radians)

Amplitude of cosine harmonic correction term to the angle of inclination (radians)

Amplitude of sine harmonic correction term to the angle of inclination (radians)

Longitude of ascending node of orbit plane at weekly epoch (radians)

Inclination angle at reference time (radians)

Rate of inclination angle (radians/sec)

Argument of perigee (radians)

Rate of right ascension (radians/sec)

At step 303, some of the terms in the 15 term set are set to zero. The terms that are selected are the 6 harmonic terms such that there are 9 remaining parameters. This approach is particularly useful when bandwidth and/or packet size is limited in the communication link that will be used to convey the orbit model to the satellite signal receiver, e.g., the remote GPS receiver. The subset of 9 parameters, by setting all harmonic terms in the model to zero, is:

Square root of semi-major axis (meters^½)

Eccentricity (dimensionless)

Mean motion difference from computed value (radians/sec)

Mean anomaly at reference time (radians)

Longitude of ascending node of orbit plane at weekly epoch (radians)

Inclination angle at reference time (radians)

Rate of inclination angle (radians/sec)

Argument of perigee (radians)

Rate of right ascension (radians/sec)

The receiver can then reconstruct a standard ephemeris model by setting the "missing" harmonic terms to zero. In essence, the receiver reformats the STD for processing by the receiver circuits.

Figure 4:
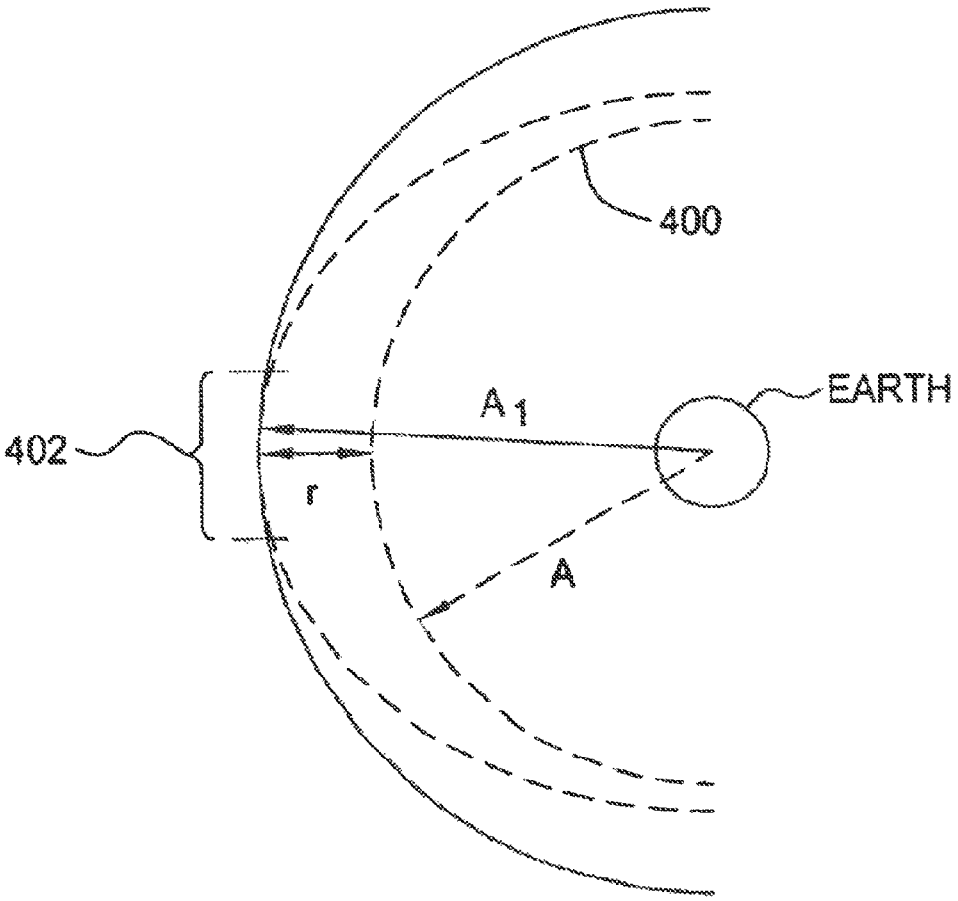
FIG. 4 depicts an example of compacting the orbit model, where two orbit model terms are compacted into a single term.

As an example of the method of generating the compact model, consider FIG. 4, which shows, for simplicity, just two terms of an orbit 400: an orbital radius (A), and a radial harmonic term (r). For this simple example, these two terms form the non-compact model, wherein the orbit is described by a circle of radius (A) plus a harmonic perturbation (r). To produce a more compact model that fits the actual orbit over an interval 402, the method of the invention removes the harmonic term (i.e., sets the term (r) to zero) and increases the orbital radius (A) to a larger value ($A_1$). The compact model is an orbit described by a circle with radius $A_1$. If an application requires a non-compact orbit model, then the compact model ($A_1$) can be represented as a non-compact model by specifying a harmonic term ($r_1$) equal to zero. This compact model will fit the original orbit, over an interval 402, with a small error.

In the preferred embodiment, 6 harmonic terms are removed from the 15-parameter model, and the other 9 terms are adjusted by process 300 that is analogous to the example 400 to provide a compact model that is accurate over a pre-defined interval. By adjusting the 9 remaining terms of an orbit model, while "zeroing" 6 harmonic terms, the compact model can be made accurate over a period of time such that a GPS receiver that relies on a compact model to compute position would compute a location that is no more than 2 meters less accurate than if the receiver used a full orbit model to compute position.

There are many alternative embodiments that will be readily apparent to those skilled in the art, such as removing more or fewer terms before adjusting the remaining terms, setting removed terms to some value other than zero, and defining new terms that model the orbit.

Returning to FIG. 3, at step 304, the orbit model is used to predict what the trajectory would be, the predicted data is denoted the "Model Trajectory Data" (MTD). If the model were perfect, the MTD would coincide exactly with the STD. At step 306, the MTD and STD are compared to see how closely the orbit model fits the orbit data. In the preferred embodiment, the comparison step 306 is performed by summing the squares of the differences between each trajectory point in the STD and the corresponding point in the MTD, and comparing the resulting sum to a threshold. If the fit is "good", the model parameters are deemed "good" and the process stops at step 310. If the fit is not good then the model parameters are adjusted at step 308. There are many techniques well known in the art for adjusting model parameters to fit data. Steps 304, 306 and 308 are repeated until the model parameters are found that fit the STD well.

There are a large number of alternative embodiments to reduce the size of the data, i.e., compacting the STD, while still providing a model that fits the STD, including:

Removing parameters from the model, and replacing them with a constant, such as zero—as done above—or some other predetermined value, which is either stored in the Remote GPS Receiver, or occasionally sent to the receiver. The predetermined value may be determined by a GPS almanac stored at both the receiver, and the distribution server.

The resolution of the parameters may be restricted in the process 300, this too reduces the amount of data that must be sent to the mobile GPS receiver.

Parameters, which are similar among two or more satellites, may be represented as a master value plus a delta, where the delta requires fewer bits to encode; an example of this is the parameter Eccentricity, which changes very little among different GPS satellites.

Some of these approaches reduce the ability of the model to fit the data over a period of time (e.g., four hours). In this case, the fit interval may be reduced (e.g. to two hours) to compensate. The accuracy of fit of the model can be traded off against the period of time over which the model is valid. While the foregoing is directed to the preferred embodiment of the present invention, other and further embodiments of the invention may be devised without departing from the basic scope thereof, and the scope thereof is determined by the claims that follow.

What is claimed is:

~~1. A method of creating and distributing compact satellite orbit models comprising:~~

~~receiving satellite signals from at least one satellite and at least one receiving station;~~

~~extracting at least a portion of the satellite tracking data from said satellite signal, representing said data in a first format;~~

~~transmitting the formatted data to a remote receiver; and~~

~~at the remote receiver, representing said formatted data in a second format supported by the remote receiver.~~

~~2. The method of claim 1 wherein said satellite tracking data comprises at least one of a satellite orbit model or a satellite clock model.~~

[3. The method of claim 1 wherein said satellite tracking data comprises at least one of: data representative of a satellite orbit model, orbit model, data representative of a satellite clock model.]

[4. The method of claim 1 wherein said second format is a format that is prescribed by said remote receiver.]

~~5. The method of claim 1 wherein said second format comprises parameters defined in ICD-GPS-200.~~

[6. The method of claim 1 wherein said first format comprises a first set of terms that define a first form of orbit model, and said second format comprises a second set of terms that define a second form of orbit model, and said second set of terms is larger than said first set of terms.]

[7. The method of claim 1 wherein said first format comprises a first set of terms that define a first form of orbit model, and said second format comprises a second set of terms that define a second form of orbit model, where said second set of terms contains said first set of terms.]

[8. The method of claim 1 wherein said first format comprises a first set of terms that define a first form of orbit model and said second format comprises a second set of terms that define a second form of orbit model, and at least one term of said first set is defined as a number with lower resolution than the corresponding term in second set.]

[9. The method of claim 1 where said data in a first format requires fewer bits to encode it than said data in a second format.]

[10. The method of claim 1 wherein said remote receiver is a GPS receiver.]

[11. The method of claim 1 wherein said remote receiver is a satellite positioning system receiver.]

[12. The method of claim 1 wherein said second format is a standard format for providing satellite models to a global positioning system receiver.]

[13. The method of claim 1 wherein said transmitting is performed using a wireless communications link.]

[14. The method of claim 13 wherein said transmitting is done without requiring from said remote receiver data representative of said remote receiver's position.]

[15. The method of claim 1 where an accuracy of the data in said first format is increased by decreasing a time interval represented by said formatted data.]

16. A method of creating and distributing a compact orbit model, *the method* comprising:

receiving [satellite signals] *measurement data* from [at least one] *a* receiving station, *the measurement data being based on satellite signals received by the receiving station*;

extracting [at least] a portion of [the] satellite tracking data from the [satellite signal, where said]*measurement data, wherein the* portion *of the satellite tracking data* comprises a first number of orbit terms that define a first orbit model, *the orbit terms comprising harmonic and non-harmonic parameters*;

formatting [said] *the* portion *of the satellite tracking data* to form formatted data having a second number of orbit terms that define a second orbit model, [where said] *wherein the* first number *of orbit terms* is greater than [said] *the* second number *of orbit terms, the second number of orbit terms excluding the harmonic parameters*;

transmitting the formatted data to a remote receiver; and

[at the remote receiver,] expanding, *by the remote receiver,* the formatted data to have the first number of *orbit* terms, *and using the expanded data to determine a location of the remote receiver.*

17. The method of claim 16, wherein [said] *the* satellite tracking data comprises at least one of [a] satellite orbit [model or a] *data and* satellite clock [model] *data*.

[18. The method of claim 16 wherein said satellite tracking data comprises at least one of: data representative of a satellite orbit model, orbit model, data representative of a satellite clock model.]

19. The method of claim 16, wherein [said] *the* second orbit model is a compact orbit model.

[20. The method of claim 16 wherein said expanding step results in a data format that is prescribed by said remote receiver.]

[21. The method of claim 20 wherein the data format having the first number of terms comprises parameters defined in ICD-GPS-200.]

22. The method of claim 16[where said], *wherein the* terms in said second orbit model [require] *is encoded with* fewer bits [to encode it] than [said] *a number of bits required to encode the* terms in [a] *the* first orbit model.

23. The method of claim 16, wherein [said] *the* remote receiver is a [GPS] *global positioning system* (*GPS*) receiver.

24. The method of claim 16, wherein [said] *the* remote receiver is a satellite positioning system receiver.

[25. The method of claim 16 where an accuracy of the data in said second orbit model is increased by decreasing a time interval represented by said formatted data defining said second orbit model.]

26. A method of creating a compact orbit model, *the method* comprising:

*receiving, by a global positioning system* (*GPS*) *receiver, satellite tracking information from one or more satellites;*

[providing] *transmitting, to a server,* a satellite orbit model having a first set of [terms] *satellite ephemeris parameters determined from the satellite tracking information, the first set of ephemeris parameters comprising harmonic parameters and non-harmonic parameters*;

adjusting, *by the server,* the first set of [terms] *satellite ephemeris parameters* to produce [a] *the* compact orbit model having a second set of [terms where] *satellite ephemeris parameters, wherein* a number of [terms] *parameters* in the first set [of terms] *of satellite ephemeris parameters* is greater than a number of [terms] *parameters* in [said] *the* second set *of satellite ephemeries parameters*[of terms], *the second set of satellite ephemeris parameters excluding the harmonic parameters; and*

*transmitting the compact orbit model to a remote receiver configured to determine a location of the remote receiver, wherein the remote receiver is configured to expand the compact orbit model, and wherein the location is based on the expanded compact orbit model.*

27. The method of claim 26, wherein [said] *the* adjusting [step] further comprises:

zeroing [a plurality of terms] *the harmonic parameters* in [said] *the* first set of [terms] *satellite ephemeris parameters*.

28. The method of claim 27, wherein [said] *the* adjusting [step] further comprises:

adjusting [a plurality of non-zero terms] *the non-harmonic parameters* in the second set of [terms] *satellite ephemeris parameters* in response to the [effects of] zeroing [terms] *of the harmonic parameters* in the first set of [terms] *satellite ephemeris parameters*.

29. [Apparatus] *An apparatus* for creating and distributing compact satellite orbit models, *the apparatus* comprising:

[at least one] *a* satellite signal receiver for receiving satellite signals from [at least one] *a* satellite;

means for *collecting measurement data from the satellite signals received by the satellite signal receiver and* extracting [at least] a portion of [the] satellite tracking data from [said] *the measurement data to represent* [satellite signal, representing said] *the portion of the*

*satellite tracking* data in a first format *that includes a first set of terms that define a first form of an orbit model, the first set of terms comprising harmonic and non-harmonic parameters*;

*means for reformatting the first form of the orbit model to generate a second format including a second set of terms that define a second form of the orbit model, the second form excluding the harmonic parameters;* a transmitter for transmitting the [formatted] *portion of the satellite tracking* data *in the second format* to a remote receiver; and

[at] *wherein* the remote receiver[, representing said formatted] *represents the portion of the satellite tracking* data in [a second] *the second format back into the first* format supported by the remote receiver, *and wherein the remote receiver is configured to use the first format to determine a location of the remote receiver*.

[30. The apparatus of claim 29 wherein said second format is a format that is prescribed by said remote receiver.]

[31. The apparatus of claim 29 wherein said second format comprises parameters defined in ICD-GPS-200.]

[32. The apparatus of claim 29 wherein said first format comprises a first set of terms that define a first form of orbit model, and said second format comprises a second set of terms that define a second form of orbit model, and said second set of terms is larger than said first set of terms.]

33. The apparatus of claim 29, wherein [said] *the* transmitter is a wireless communications transmitter.

*34. A method of creating and distributing compact satellite orbit models, the method comprising:*

*receiving, from at least one receiving station, measuring data from satellite signals received by the at least one receiving station;*

*extracting a portion of satellite tracking data from the measurement data;*

*representing the extracted portion of satellite tracking data as a compact satellite orbit model having a first format, wherein the compact satellite orbit model is a subset of satellite ephemeris parameters, wherein the satellite ephemeris parameters includes harmonic and non-harmonic parameters, and wherein the representing the extracted portion of satellite tracking data as the compact satellite orbit model comprises excluding the harmonic parameters;*

*transmitting the compact satellite orbit model having the first format to a remote receiver;*

*representing, by the remote receiver, the compact satellite orbit model having the first format in a second satellite orbit model having a second format supported by the remote receiver, wherein the second satellite orbit model includes the satellite ephemeris parameters; and*

*using the second satellite orbit model to determine a location of the remote receiver.*

*35. The method of claim 34, wherein the satellite tracking data comprises satellite clock data.*

*36. The method of claim 34, wherein the extracting includes extracting the portion of the satellite tracking data in accordance with a desired time interval.*

*37. The method of claim 36, further comprising:*

*initializing a value of a parameter from the subset of satellite ephemeris parameters based on a previous value of a parameter of a previous time interval from the subset of satellite ephemeris parameters associated with the previous time interval; and*

*adjusting the initialized value of the parameter from the subset of satellite ephemeris parameters for an entire duration of the desired time interval.*

*38. The method of claim 37, wherein the adjusting includes adjusting the initialized value of one of the non-harmonic parameters to have an equivalent value to a representation of the one of the non-harmonic parameters and one of the harmonic parameters.*

*39. The method of claim 38, wherein the one of the harmonic parameters is excluded from the subset of satellite ephemeris parameters.*

*40. The method of claim 34, wherein the remote receiver is a global positioning system (GPS) receiver.*

*41. The method of claim 34, wherein the remote receiver is a satellite positioning system receiver.*

*42. The method of claim 34, wherein the second format is a format for providing satellite models to a global positioning system (GPS) receiver.*

*43. The method of claim 34, wherein the transmitting is performed using a wireless communications link.*

*44. The method of claim 43, wherein the transmitting is carried out in a manner not requiring, from the remote receiver, data representative of the location of the remote receiver.*

*45. The method of claim 34, wherein the representing the compact satellite orbit model as the second satellite orbit model comprises:*

*replacing the excluded harmonic parameters with a value of zero.*

*46. The method of claim 34, wherein the representing the compact satellite orbit model as the second satellite orbit model comprises:*

*replacing the excluded harmonic parameters with a predetermined value determined from global positioning system (GPS) almanac data.*

*47. An apparatus for creating and distributing compact satellite orbit models, the apparatus comprising:*

*a satellite signal receiver for receiving satellite signals from a satellite;*

*means for collecting measurement data from the satellite signals received by the satellite signal receiver and extracting a portion of satellite tracking data from the measurement data to represent the portion of the satellite tracking data as a compact satellite orbit model having a first format, wherein the compact satellite orbit model is a subset of satellite ephemeris paramaters including harmonic and non-harmonic parameters, and wherein the compact satellite orbit model excludes the harmonic paramerers;*

*a transmitter for transmitting the compact satellite orbit model to a remote receiver; and*

*wherein the remote receiver represents the compact satellite orbit model in a second satellite orbit model having a second format supported by the remote receiver and determines a location of the remote receiver using the second satellite orbit model, wherein the second satellite orbit model includes the satellite ephemeris parameters.*

*48. The apparatus of claim 47, wherein the remote receiver replaces the excluded harmonic parameters with a value of zero to represent the compact satellite orbit model as the second satellite orbit model.*

*49. The apparatus of claim 47, wherein the remote receiver replaces the excluded harmonic parameters with a predetermined value determined from global positioning system (GPS) almanac data to represent the compact satellite orbit model as the second satellite orbit model.*

* * * * *